Patented Aug. 16, 1932

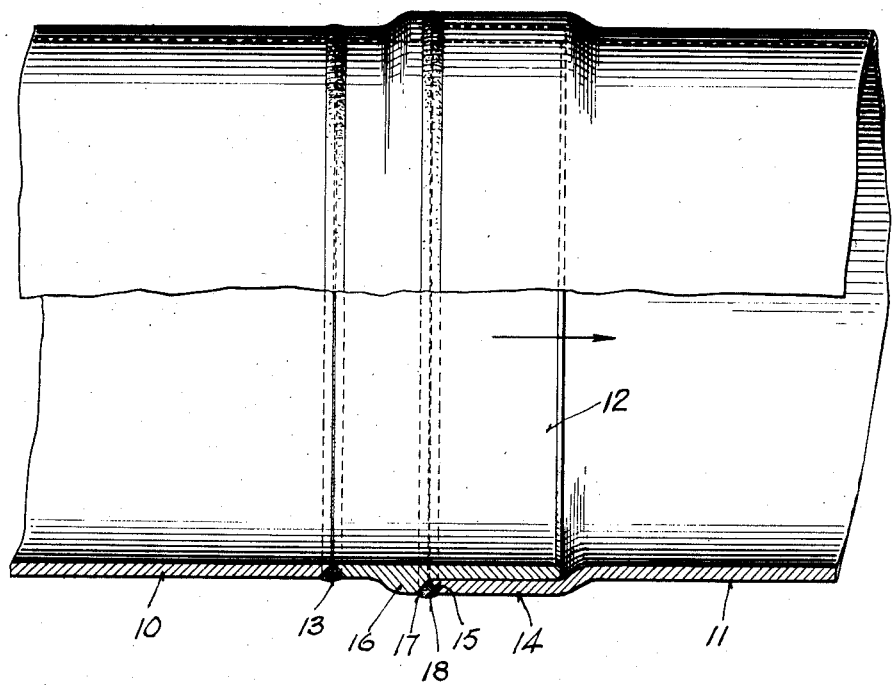

1,872,271

UNITED STATES PATENT OFFICE

RUDOLPH FURRER, OF WAUWATOSA, WISCONSIN, ASSIGNOR TO A. O. SMITH CORPORATION, OF MILWAUKEE, WISCONSIN, A CORPORATION OF NEW YORK

PIPE JOINT

Application filed July 16, 1928. Serial No. 293,184.

The invention resides in the provision of a pipe joint constituted by telescoping end portions of pipe sections to be connected, and a tension weld about the inner of the said telescoping end portions and between the said inner telescoping pipe section and the adjacent end of the outer telescoping pipe section.

The end portions of the pipe sections telescope for a substantial distance and are of substantially the same thickness, thereby providing a joint which protects the weld from injury due to bending stresses in the pipe lines.

The general nature of my invention having thus been briefly stated, I shall now particularly and fully describe the same, and shall later specifically point out the novel features thereof in claims hereto appended.

The figure of the drawing is a longitudinal sectional view of fragments of connected pipe sections, disclosing a pipe joint in which the principles of the invention are incorporated.

With respect to the drawing and the numerals of reference thereon, 10 and 11 represent, respectively, ordinary pipe sections to be connected, and 12 designates a stab ring secured, as by any ordinary or preferred weld 13, to the end of the pipe section 10 which is adjacent the pipe section 11. It is to be understood that the pipe section 10 and the stab ring 12 could be comprised of a single tube, the interposition of the weld 13 merely being for the purpose of convenience in manufacture.

The pipe sections 10 and 11 are, as shown, of approximately equal diameter, and the end portion or stab ring 12 of the pipe section 10 snugly fits into the adjacent end portion of the pipe section 11. To the accomplishment of this, the said adjacent end portion of the pipe section 11 is conveniently bulged as indicated at 14, so that the elements 14 and 12 interengage each other to provide a so-called bell and spigot construction of pipe joint.

The end portion or stab ring 12 is provided upon its circumference, and at location adjacent the free end 15 of the bulged portion 14, with an annular flange, bead, or rib 16 which is perpendicular to and protrudes outwardly from the said end portion or stab ring 12 preferably to a circumference aligning with the outer circumference of the bulged portion 14.

The pipe sections are so assembled that the end 15 of the pipe section 11 and the adjacent surface 17 of the annular flange, bead, or rib 16 of the element 12, bear relation to each other providing an annular welding groove of uniform width throughout its circumference adapted to contain any suitable arc-produced or gas-produced weld 18 for homogeneously securing the said end 15 and surface 17 to each other. As shown, the annular welding groove having the weld 18 is of ordinary V configuration.

It should be noted that the flange, bead, or rib 16, which is in longitudinal alignment with the bulged portion 14, could be produced by providing an annular offset in the circumference of the end portion or stab ring 12, without the employment of additional thickness of metal at the location of the weld 18, but the arrangement as disclosed is to be preferred because the additional thickness of metal insures against the possibility of burning through the end portion or stab ring 12 at the location of the surface 17 during the operation of producing the weld 18. The bulging of the free end portion of the pipe section 11 might even be dispensed with, but the bell and spigot arrangement is preferable because of the fact that it does not reduce the internal diameter of the pipe. The arrow in the drawing denotes the direction of flow of fluid in the pipe line.

Particular attention is called to the fact that the weld 18 is a so-called tension weld and not a so-called shear weld. That is to say, the weld 18 is located between the end 15 of the pipe 11 and the flange, bead, or rib 16 of the pipe 10, which latter aligns with the wall of the bulged portion 14, in such manner that forces tending to move the pipe section 10 and 11 apart will be imparted to the weld 18 to place it under tension throughout the whole of its cross-sectional area. There will be no tendency toward shearing the weld away from its set location. Actually, the annular end 15 and the annular surface 17 provide a dam for the welding material 18.

It has been already stated that the additional thickness of metal constituting the annular flange, bead, or rib 16 precludes burning through of the metal at the location of the surface 17. It might be added that so long as there is a satisfactory jointure of parent metal and welding metal about the pipe sections at the locations of the said surface 17 of the pipe 10 and the end 15 of the pipe 11, no harmful consequence would result from a burning of the metal of the end portion or stab ring 12 at location beneath (within) the weld 18, as will be obvious. Evidently, the metal of the said element 12 beneath (within) the weld 18 functions after the fashion of a chill strip during the welding operation.

The telescoping feature of the pipe sections, when of the bell and spigot construction, or other preferred construction, permits ready and convenient assembly thereof, and makes possible the continuous use of a pipe line even though repairs at the welds 18 may be necessary. The substantially equal thickness of the bell and spigot members provides a more uniform distribution of the bending stresses at the joint and the substantial distance of overlap between the bell and spigot protects the weld metal from excessive stresses which might otherwise be set up due to bending stresses in the pipe line.

In practice, when the pipe sections leave the factory, each will desirably include, as an integral part thereof, an end portion or stab ring 12 at one of its ends, and a bulged portion 14 at its other end. The assembling and welding together of the said elements 12 and 14 of different pipe sections of necessity has to be accomplished in the field. As will be evident, the flange, bead, or rib 16 provides a gage or stop adapted to engage the end of the bulged portion to insure that the end portions will, in the instance of each pipe joint, be properly and uniformly assembled. In instances when pipe sections have been telescopingly assembled heretofore there has been no manner of definitely and readily assuring how much of the length of the end portion of the inner pipe section was actually positioned within the adjacent end portion of the outer pipe section at the time of producing the weld.

Having thus fully described my invention, what I claim and desire to secure by Letters Patent of the United States, is:

1. A welded pipe joint comprising end portions of pipe sections including a spigot at the end of one section and a bell at the end of the other section telescoping said spigot for a substantial distance, said bell being of substantially the same thickness as said spigot, a raised circumferential bead on said spigot adjacent the end of the bell, and weld metal joining said bead and spigot to the end of said bell.

2. A welded pipe joint comprising end portions of pipe sections including a spigot at the end of one section and a bell at the end of the other section telescoping said spigot for a substantial distance, said bell and spigot being of substantially the same thickness as the pipe stock, a raised circumferential bead on said spigot adjacent the end of the bell and of a thickness substantially equal to the thickness of said bell, and weld metal joining said bead and spigot to the end of said bell.

3. A welded pipe joint comprising bell and spigot telescoping end sections of the pipes to be joined of substantially the same thickness, a raised circumferential bead on the spigot adjacent the end of the bell for aligning the sections and forming a welding dam, the telescoping portion of the bell being longer than the spigot to provide a space between the end of said spigot and the shoulder of said bell, and fused welding metal deposited between said bead an the end of the bell to join the pipe sections into a unitary structure.

In testimony whereof, I signed my name at Milwaukee, this 13th day of July, 1928.

RUDOLPH FURRER.